(12) United States Patent
Iida

(10) Patent No.: US 10,753,253 B2
(45) Date of Patent: Aug. 25, 2020

(54) COOLING DEVICE FOR ADDITIVE INJECTION VALVE

(71) Applicant: DENSO CORPORATION, Kariya, Aichi-pref. (JP)

(72) Inventor: Junya Iida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/227,272

(22) Filed: Dec. 20, 2018

(65) Prior Publication Data

US 2019/0195108 A1    Jun. 27, 2019

(30) Foreign Application Priority Data

Dec. 25, 2017    (JP) .................... 2017-248243

(51) Int. Cl.

| F01N 3/20 | (2006.01) |
| F16K 49/00 | (2006.01) |
| F01N 3/24 | (2006.01) |
| F02M 53/04 | (2006.01) |
| F02M 26/72 | (2016.01) |
| F02M 26/73 | (2016.01) |
| F02M 25/08 | (2006.01) |

(52) U.S. Cl.
CPC ............ *F01N 3/2066* (2013.01); *F01N 3/24* (2013.01); *F02M 26/72* (2016.02); *F02M 26/73* (2016.02); *F02M 53/04* (2013.01); *F16K 49/00* (2013.01); *F16K 49/005* (2013.01); *F02M 2025/0881* (2013.01)

(58) Field of Classification Search
CPC ........... F01N 2260/024; F01N 2290/00; F01N 2610/02; F01N 2610/11; F01N 3/206; F01N 3/2066; F01N 3/24; F16K 49/00; F16K 49/005
See application file for complete search history.

(56) References Cited

U.S. PATENT DOCUMENTS

| 7,043,922 B2 | 5/2006 | Thompson et al. |
| 8,881,995 B2 | 11/2014 | Prociw et al. |
| 8,973,355 B2 | 3/2015 | Shovels |
| 9,284,871 B2 | 3/2016 | Knittel et al. |
| 9,518,592 B2 | 12/2016 | Wright et al. |
| 2014/0014204 A1* | 1/2014 | Wright .............. F16L 53/00 137/594 |
| 2014/0299202 A1 | 10/2014 | Winkler et al. |
| 2014/0311130 A1 | 10/2014 | Knittel et al. |

(Continued)

FOREIGN PATENT DOCUMENTS

| DE | 102009047375 | 6/2011 |
| EP | 2725227 | 5/2015 |
| JP | 10-159559 | 6/1998 |

*Primary Examiner* — Anthony Ayala Delgado
(74) *Attorney, Agent, or Firm* — Nixon & Vanderhye PC (57) ABSTRACT

A cooling device configured to cool, using a coolant, an injection valve that injects an additive includes a rotary member surrounding an outer periphery of the injection valve and extending along the injection valve. The rotary member is supported to be rotatable around the injection valve. A clearance between an outer peripheral surface of the injection valve and an inner peripheral surface of the rotary member defines a passage through which the coolant flows. The rotary member has a rotation imparting part that causes the rotary member to rotate about the injection valve in response to a flow of the coolant.

9 Claims, 6 Drawing Sheets

(56) References Cited

U.S. PATENT DOCUMENTS

| | | |
|---|---|---|
| 2015/0027108 A1 | 1/2015 | Winkler et al. |
| 2016/0053650 A1 | 2/2016 | Seitz et al. |
| 2017/0335732 A1* | 11/2017 | Kim .................. F01N 9/005 |
| 2017/0363053 A1 | 12/2017 | Ichihashi et al. |
| 2018/0328315 A1* | 11/2018 | Taniel .................. F02M 43/04 |

* cited by examiner

COOLING DEVICE FOR ADDITIVE INJECTION VALVE

CROSS REFERENCE TO RELATED APPLICATION

This application is based on Japanese Patent Application No. 2017-248243 filed on Dec. 25, 2017, the disclosure of which is incorporated herein by reference in its entirety.

TECHNICAL FIELD

The present disclosure relates to a cooling device which uses a coolant to cool an injection valve for injecting an additive.

BACKGROUND

A cooling device has a guide to guide cooling water (coolant) to a distal end of an injection valve where a temperature increase easily occurs.

SUMMARY

According to an aspect of the present disclosure, a cooling device configured to cool, using a coolant, an injection valve that injects an additive includes a rotary member surrounding an outer periphery of the injection valve and extending along the injection valve. The rotary member is supported to be rotatable around the injection valve. A clearance between an outer peripheral surface of the injection valve and an inner peripheral surface of the rotary member defines a passage through which the coolant flows. The rotary member has a rotation imparting part that causes the rotary member to rotate about the injection valve in response to a flow of the coolant.

DETAILED DESCRIPTION

Hereinafter, an embodiment will be described with reference to the drawings, regarding a cooling device for an injection valve that injects urea (additive) into an exhaust passage of an internal combustion engine.

Figure 1:
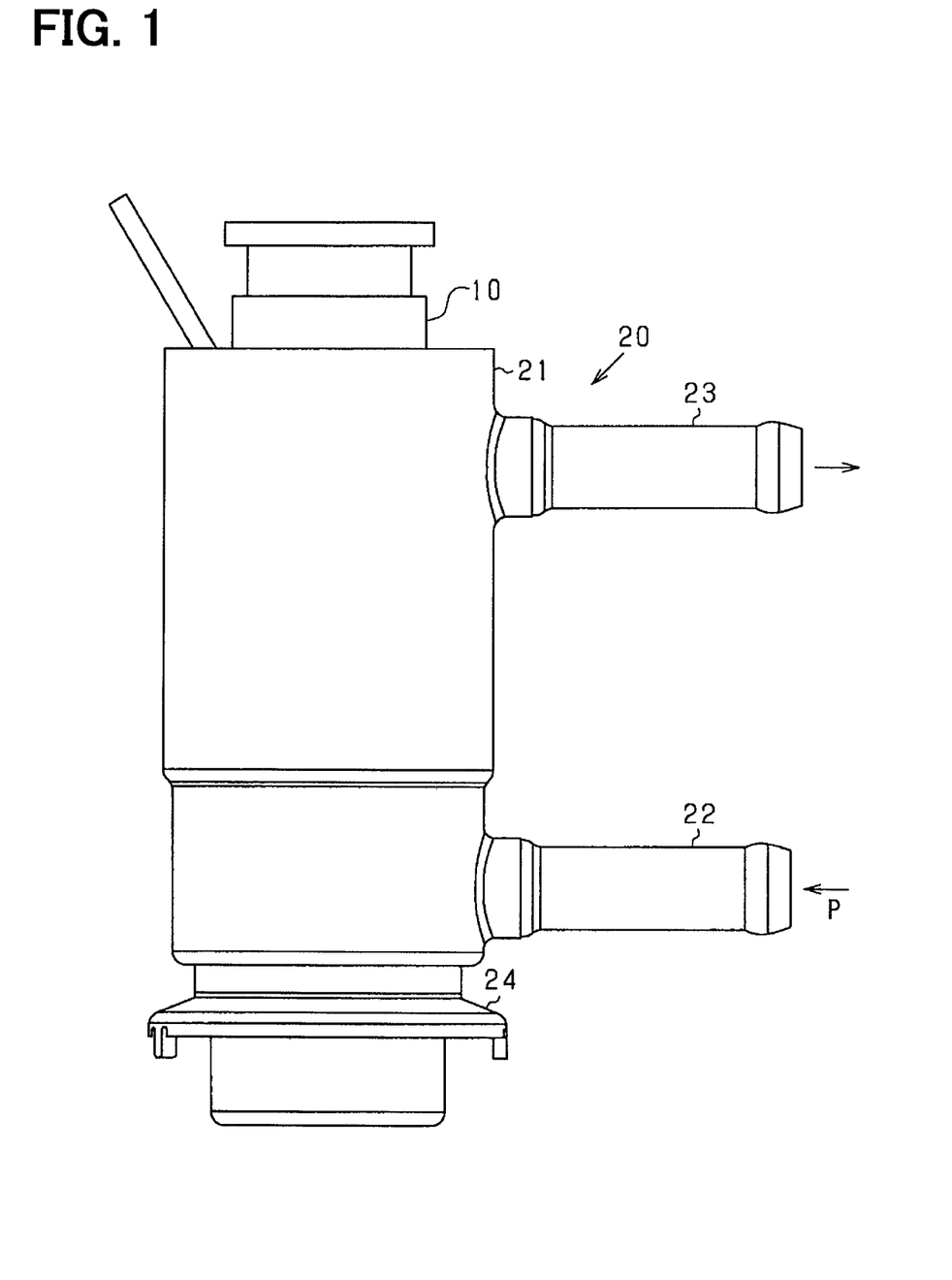
FIG. 1 is a front view illustrating an injection valve and a cooling device.
Figure 2:
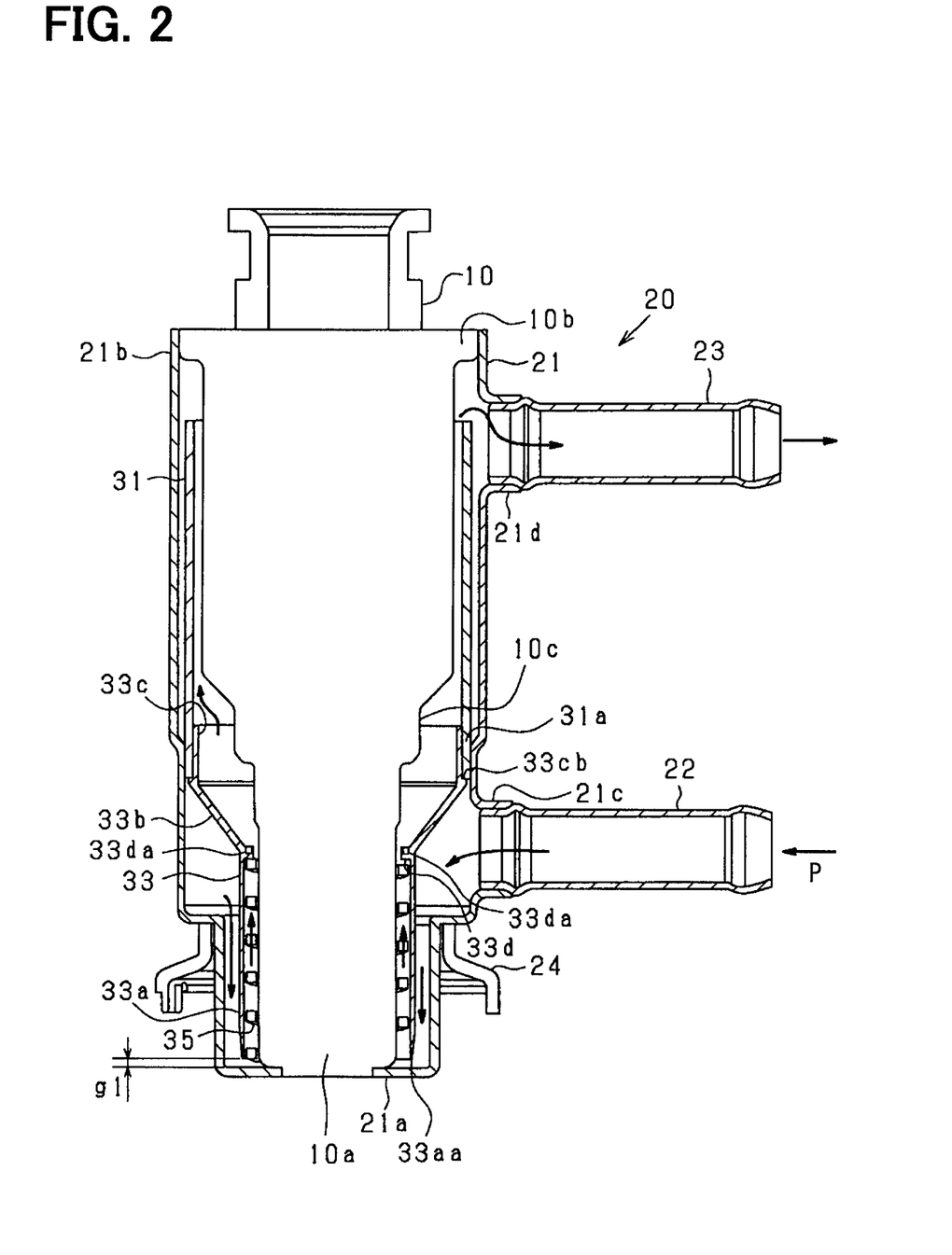
FIG. 2 is a partial cross-sectional view of FIG. 1.

As shown in FIGS. 1 and 2, a cooling device 20 (a cooling device for an additive injection valve) is attached to the injection valve 10. The injection valve 10 is formed in a cylindrical shape. The injection valve 10 injects urea from the tip portion 10a.

The cooling device 20 includes a main body 21, a first pipe 22, a second pipe 23, a fixed member 31, a rotary member 33, a first spring 35, a second spring 37, and a mounting member 24. The cooling device 20 is attached to the exhaust pipe of the internal combustion engine by the mounting member 24.

The main body 21 is formed in a cylindrical shape having a diameter larger than the diameter of the injection valve 10. The first end portion 21a of the main body 21 is joined to the outer peripheral surface of the tip portion 10a of the injection valve 10. The second end portion 21b of the main body 21 is joined to the outer peripheral surface of the enlarged diameter portion 10b (base end portion) of the injection valve 10. A first port 21c and a second port 21d are formed in the main body 21. The first pipe 22 is connected to the first port 21c. The second pipe 23 is connected to the second port 21d. The second port 21d is located above the first port 21c. That is, the second port 21d is provided above the first port 21c.

The cylindrical fixed member 31 is housed inside the main body 21. The fixed member 31 is provided within a range from the first port 21c to the second port 21d. A first end portion 31a of the fixed member 31 adjacent to the first port 21c is fixed to the main body 21. A clearance between the first end portion 31a and the main body 21 is sealed. A part of the injection valve 10, specifically, not including the tip portion 10a is inserted inside the fixed member 31. That is, the fixed member 31 surrounds the outer periphery of the injection valve 10, and extends along the injection valve 10. A predetermined clearance is formed between the inner peripheral surface of the fixed member 31 and the outer peripheral surface of the injection valve 10, and the predetermined clearance defines a passage for the cooling water.

The cylindrical rotary member 33 is housed inside the main body 21. The rotary member 33 is provided within a range from the tip portion 10a of the injection valve 10 to the first end portion 31a of the fixed member 31. That is, the rotary member 33 extends from the outer periphery of the tip portion 10a of the injection valve 10 along the injection valve 10. A part of the injection valve 10, specifically, including the tip portion 10a is inserted into the rotary member 33. That is, the rotary member 33 surrounds the outer periphery of the injection valve 10, and extends along the injection valve 10. The rotary member 33 includes a first cylindrical portion 33a, a conical portion 33b, and a second cylindrical portion 33c in this order from the distal end (adjacent to the first end portion 21a). A first gap g1 is formed between the distal end 33aa of the first cylindrical portion 33a and the first end portion 21a of the main body 21.

The first cylindrical portion 33a and the second cylindrical portion 33c are formed in cylindrical shape. The diameter of the first cylindrical portion 33a is smaller than the diameter of the second cylindrical portion 33c. The conical portion 33b is formed in a conical cylindrical shape. The conical portion 33b connects the first cylindrical portion 33a and the second cylindrical portion 33c. The diameter of the conical portion 33b is enlarged from a side adjacent to the first cylindrical portion 33a toward the other side adjacent to the second cylindrical portion 33c. A predetermined clearance is formed between the respective inner peripheral surfaces of the first cylindrical portion 33a, the conical portion 33b, and the second cylindrical portion 33c and the outer peripheral surface of the injection valve 10, as a passage for the cooling water. A predetermined clearance is formed between the respective outer peripheral surfaces of the first cylindrical portion 33a, the conical portion 33b, and the second cylindrical portion 33c and the inner peripheral surface of the main body 21, as a passage for the cooling water.

A first passage is defined by the predetermined clearance between the respective outer peripheral surfaces of the first cylindrical portion 33a, the conical portion 33b, and the second cylindrical portion 33c and the inner peripheral surface of the main body 21. The first passage is connected to the first port 21c and extends to the outer periphery of the tip portion 10a of the injection valve 10. A second passage is defined by the predetermined clearance between the respective inner peripheral surfaces of the first cylindrical portion 33a, the conical portion 33b, the second cylindrical portion 33c, and the fixed member 31 and the outer peripheral surface of the injection valve 10. The second passage is connected to the first passage, extends along the injection valve 10 from the outer periphery of the tip portion 10a, and is connected to the second port 21d. The first passage and the second passage define a coolant passage.

A projection 33d projecting annularly on the inner peripheral side is formed at the boundary between the first cylindrical portion 33a and the conical portion 33b. A smaller clearance is formed between the outer circumferential surface of the injection valve 10 and the inner circumferential surface of the projection 33d, and is smaller than those on both the upstream side and the downstream side in the flow of the cooling water. In other words, the projection 33d (throttle portion) reduces the passage area at the predetermined position in the second passage to be smaller than the passage area at the position adjacent to the predetermined position. Plural through holes 33da pass through the projection 33d in the axial direction of the injection valve 10. Details of the through hole 33da will be described later. The outer peripheral surface of the injection valve 10 and the inner peripheral surface of the projection 33d may be in contact with each other.

The first spring 35 is housed inside the first cylindrical portion 33a. The first spring 35 (regulating portion) is disposed between the outer peripheral surface of the injection valve 10 and the inner peripheral surface of the first cylindrical portion 33a. The first spring 35 is disposed between the first end portion 21a of the main body 21 and the projection 33d. A clearance is formed between the outer peripheral surface of the injection valve 10 and the first spring 35, and a clearance is formed between the inner peripheral surface of the first cylindrical portion 33a and the first spring 35. The first spring 35 is formed by a coil spring having a spring coefficient k1.

The spring coefficient k1 of the first spring 35 is set sufficiently large. Therefore, even if the first spring 35 is pressed by the projection 33d, due to the gravity acting on the rotary member 33, the first spring 35 hardly contracts, and the movement of the rotary member 33 toward the first end portion 21a is regulated by the first spring 35.

A part of the second cylindrical portion 33c adjacent to the conical portion 33b has a protrusion 33cb which protrudes annularly on the outer peripheral side. The second cylindrical portion 33c (the end portion of the rotary member 33 opposite to the tip portion 10a of the injection valve 10) is slidably fitted with the first end portion 31a of the fixed member 31 (the end portion of the fixed member 31 adjacent to the tip portion 10a of the injection valve 10). That is, the rotary member 33 is supported by the fixed member 31 so as to be rotatable around the injection valve 10. The cooling water does not leak from a gap between the outer peripheral surface of the second cylindrical portion 33c and the inner peripheral surface of the first end portion 31a of the fixed member 31, or the leakage amount of the cooling water is small. The end surface of the first end portion 31a and the protrusion 33cb are in contact with each other, or a small gap is formed between the end surface of the first end portion 31a and the protrusion 33cb.

Figure 3:
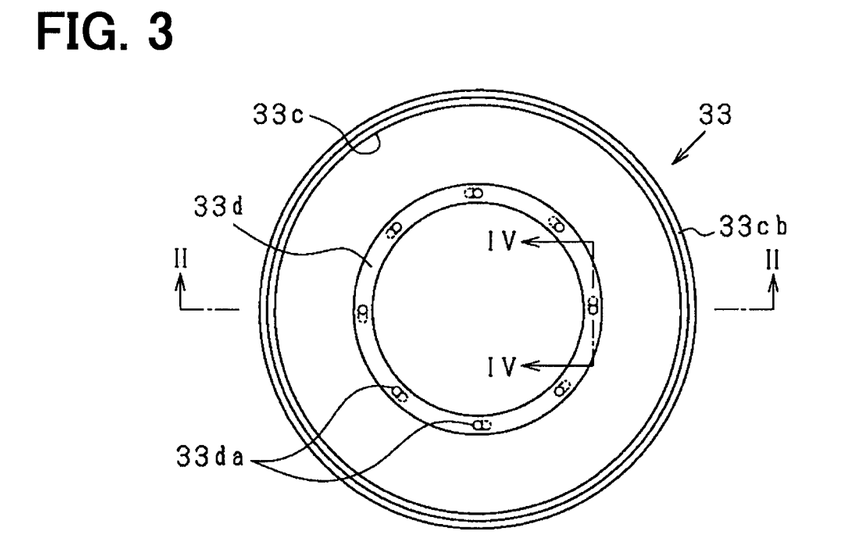
FIG. 3 is a plan view illustrating a rotary member.
Figure 4:
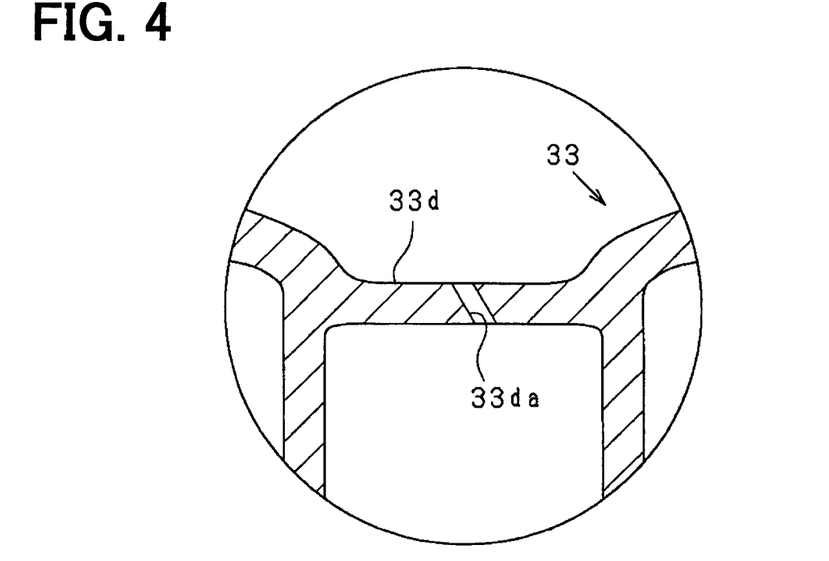
FIG. 4 is a cross-sectional view taken along a line IV-IV of FIG. 3.

FIG. 3 is a plan view of the rotary member 33. FIG. 4 is a cross-sectional view taken along a line IV-IV of FIG. 3. The rotary member 33 of FIG. 2 corresponds to a cross-sectional view taken along a line II-II in FIG. 3.

As shown in FIG. 3, the through holes 33da are formed in the projection 33d of the rotary member 33 at a predetermined interval in the circumferential direction. The through hole 33da passes through the projection 33d in the axial direction of the injection valve 10. As shown in FIG. 4, the through hole 33da is inclined in the circumferential direction of the rotary member 33 (injection valve 10). The projection 33d and the through holes 33da define a rotation imparting part.

As shown in FIG. 2, when cooling water is made to flow in the positive direction P (first direction) in the cooling device 20, the cooling water flows as indicated by arrows in FIG. 2. When the cooling water flows in the positive direction P, the cooling water flows into the first pipe 22, and the cooling water flows out from the second pipe 23. In some cases, bubbles may adhere to the injection valve 10 in the passage for the coolant formed by the gap between the outer peripheral surface of the injection valve 10 and the inner peripheral surface of the rotary member 33. In that case, the bubbles act as a heat insulating layer, and the efficiency of cooling the injection valve 10 may decrease. In particular, since the temperature of the tip portion 10a of the injection valve 10 tends to rise easily, it is desirable to quickly remove the bubbles from the tip portion 10a.

In this regard, the plural through holes 33da are formed in the projection 33d of the rotary member 33. When the cooling water passes through the through holes 33da, a force to rotate the rotary member 33 around the injection valve 10 acts. Therefore, when the projection 33d and the through hole 33da receive the flow of the cooling water, the rotatably-supported rotary member 33 rotates around the injection valve 10. When the cooling water flows in the positive direction P, the rotary member 33 rotates counterclockwise in FIG. 3. That is, when the cooling water passes through the through hole 33da, a part of the kinetic energy of the cooling water is converted into rotational energy which rotates the rotary member 33 about the injection valve 10.

When the rotary member 33 rotates, the cooling water is pulled to the rotary member 33 due to the viscosity of the cooling water. For this reason, a force acts for moving the cooling water flowing in the axial direction of the injection valve 10 in the circumferential direction of the injection valve 10 together with the rotary member 33. Therefore, a swirl flow around the injection valve 10 is generated in the cooling water flowing along the injection valve 10.

When cooling water is made to flow in the reverse direction (second direction) in the cooling device 20, the cooling water flows in the direction opposite to the directions indicated by the arrows in FIG. 2. In the case where the cooling water flows in the reverse direction, the cooling water flows into the second pipe 23, and the cooling water flows out from the first pipe 22. Also in this case, as the cooling water passes through the through hole 33da, a force for rotating the rotary member 33 around the injection valve 10 acts. Therefore, when the projection 33d and the through hole 33*da* receive the flow of the cooling water, the rotatably-supported rotary member 33 rotates around the injection valve 10. When the cooling water is made to flow in the reverse direction, the rotary member 33 rotates clockwise in FIG. 3. For this reason, a force acts for moving the cooling water flowing in the axial direction of the injection valve 10 in the circumferential direction of the injection valve 10 together with the rotary member 33. Therefore, a swirl flow around the injection valve 10 is generated in the cooling water flowing along the injection valve 10.

The present embodiment described above has following advantages.

The rotary member 33 has the projection 33*d* and the through hole 33*da* which rotate the rotary member 33 around the injection valve 10 by receiving the flow of cooling water. Therefore, when the projection 33*d* and the through hole 33*da* receive the flow of the cooling water, the rotatably-supported rotary member 33 rotates around the injection valve 10. Then, due to the viscosity of the cooling water, the cooling water is pulled to the rotary member 33, and a swirl flow around the injection valve 10 is generated in the cooling water flowing along the injection valve 10. Therefore, bubbles adhering to the injection valve 10 can be easily removed by the swirl flow, and consequently it is possible to suppress a decrease in the efficiency of cooling the injection valve 10.

The cooling water circulates through a passage formed by the clearance between the outer peripheral surface of the injection valve 10 and the inner peripheral surface of the fixed member 31. The end portion (the second cylindrical portion 33*c*) of the rotary member 33 opposite from the tip portion 10*a* of the injection valve 10 and an end portion (the first end portion 31*a*) of the fixed member 31 adjacent to the tip portion 10*a* of the injection valve 10 are fitted with each other, and can slide relative to each other in the circumferential direction of the injection valve 10. Therefore, it is possible to rotatably support the rotary member 33 around the injection valve 10 by the fixed member 31, and to prevent leakage of the cooling water from a gap between the fixed member 31 and the rotary member 33.

A part of the kinetic energy of the cooling water is converted into rotational energy rotating the rotary member 33 around the injection valve 10 by the projection 33*d* and the through hole 33*da*. Therefore, the rotary member 33 can be rotated about the injection valve 10.

Since the through hole 33*da* penetrates the projection 33*d* in the axial direction of the injection valve 10 and is inclined in the circumferential direction of the injection valve 10, when the cooling water passes through the through hole 33*da*, a force acts for rotating the rotary member 33 around the injection valve 10. Therefore, the rotary member 33 can be rotated about the injection valve 10.

The projection 33*d* abuts against the first spring 35 which restricts the movement of the rotary member 33 toward the tip portion 10*a* of the injection valve 10 in the axial direction. Therefore, the projection 33*d* can function as a portion to be brought into contact with the first spring 35.

Since the rotary member 33 extends from the outer periphery of the tip portion 10*a* of the injection valve 10 along the injection valve 10, a swirl flow around the injection valve 10 occurs in the cooling water in the vicinity of the tip portion 10*a* of the injection valve 10. Therefore, bubbles adhering to the tip portion 10*a* of the injection valve 10 can be easily removed, while the temperature tends to rise easily around the tip portion 10*a*.

The flow velocity of the cooling water can be raised in the swirling direction by generating the swirl flow around the injection valve 10 in the cooling water, in addition to the axial velocity. Therefore, it is possible to raise the overall flow velocity of the cooling water relative to the injection valve 10. Therefore, the efficiency of cooling the injection valve 10 can be improved.

It should be noted that the above embodiment may be modified as follows. The same parts as those of the above embodiment are denoted by the same reference numerals, and the description thereof is omitted.

It is also possible to adopt a configuration in which the rotary member 33 extends along the injection valve 10 from a position shifted toward the enlarged diameter portion 10*b* from the outer periphery of the tip portion 10*a* of the injection valve 10.

The projection 33*d* and the first spring 35 may be provided on the outer peripheral side, instead of the inner peripheral side of the rotary member 33. Further, the through hole 33*da* may be formed in the projection 33*d* provided on the outer peripheral side. Even with such a configuration, it is possible to achieve the action and effect similar to the above embodiment. Further, it is also possible to provide the projection 33*d* having the through holes 33*da* and the first spring 35 on both the inner peripheral side and the outer peripheral side of the rotary member 33. In this case, the plural through holes 33*da* may be formed so that a force for rotating the rotary member 33 in the same direction acts on the inner peripheral side and the outer peripheral side of the rotary member 33. The first spring 35 may be provided on only one of the inner peripheral side and the outer peripheral side of the rotary member 33.

Figure 5:
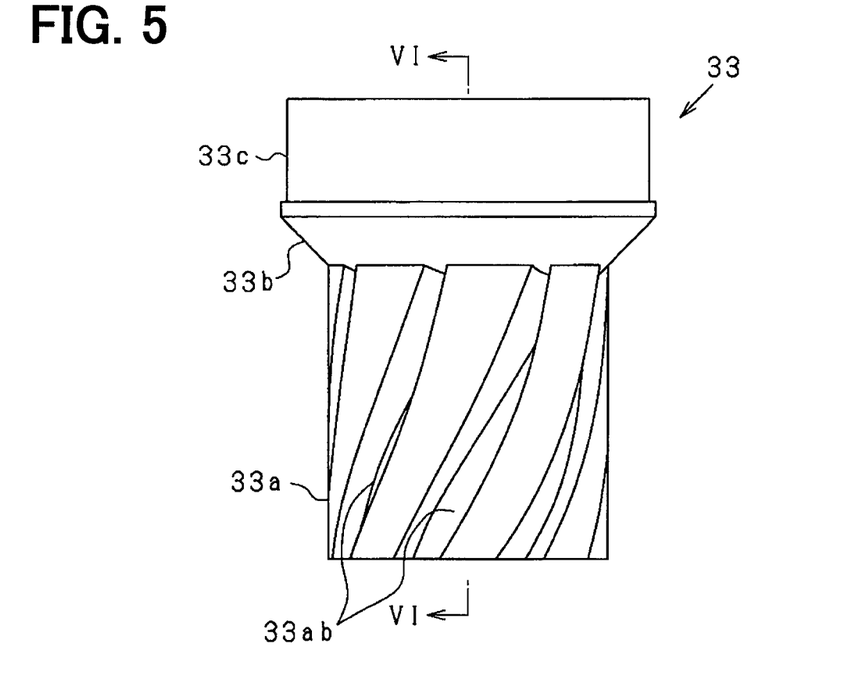
FIG. 5 is a front view illustrating a modification of the rotary member.
Figure 6:
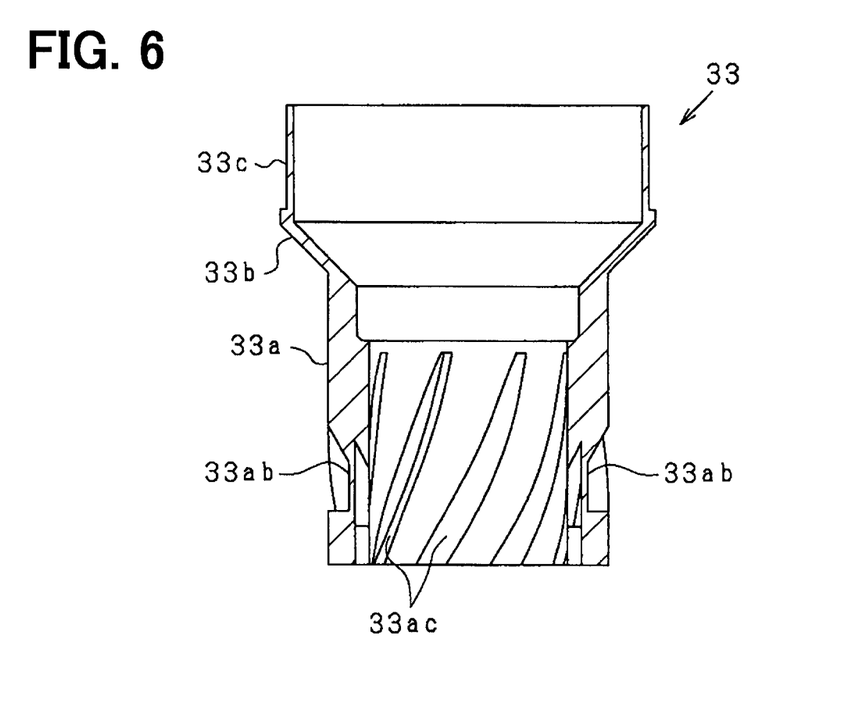
FIG. 6 is a cross-sectional view taken along a line VI-VI of FIG. 5.

FIG. 5 is a front view illustrating a modification of the rotary member 33, and FIG. 6 is a sectional view taken along a line VI-VI of FIG. 5. As shown in FIGS. 5 and 6, plural helical grooves 33*ab* (rotation imparting part) are formed along the outer peripheral surface of the rotary member 33, and plural helical grooves 33*ac* (rotation imparting part) are formed along the inner peripheral surface of the rotary member 33. According to such a configuration, since the cooling water passes through the grooves 33*ab*, 33*ac*, a force for rotating the rotary member 33 around the injection valve 10 acts, so that the rotary member 33 can be rotated about the injection valve 10. Therefore, it is possible to achieve the action and effect similar to the above embodiment. It should be noted that only one of the groove 33*ab* and the groove 33*ac* may be formed in the rotary member 33.

Figure 7:
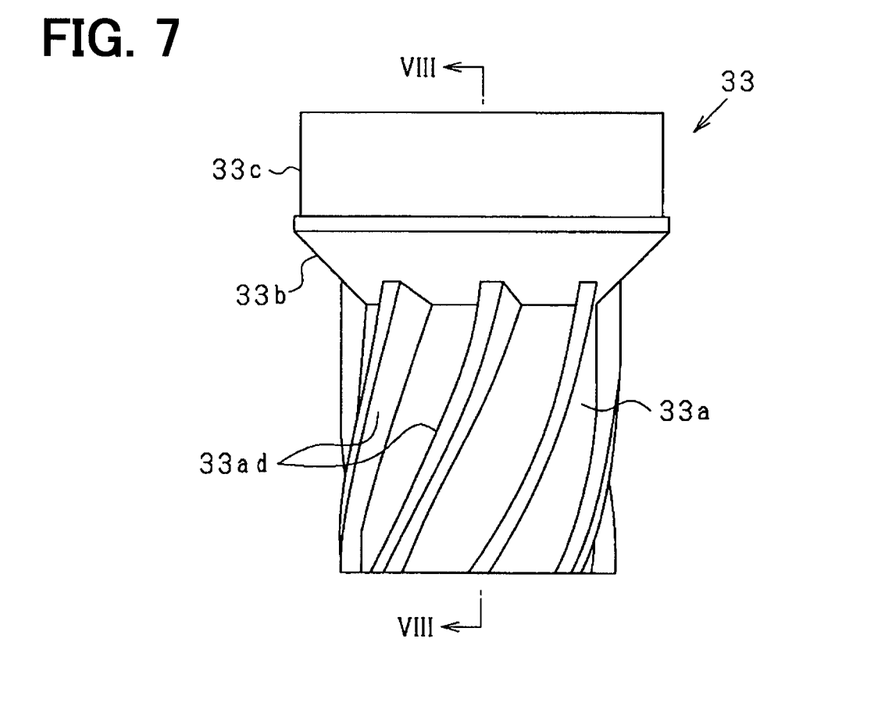
FIG. 7 is a front view illustrating another modification of the rotary member.
Figure 8:
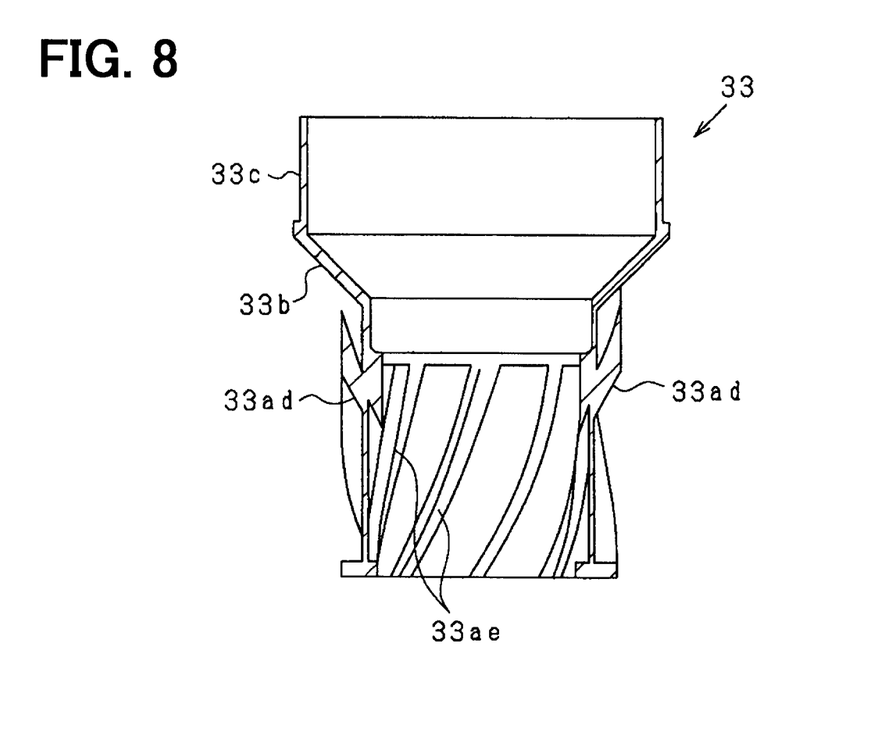
FIG. 8 is a cross-sectional view taken along a line VIII-VIII of FIG. 7.

FIG. 7 is a front view illustrating another modification of the rotary member 33, and FIG. 8 is a sectional view taken along the line VIII-VIII of FIG. 7. As shown in FIGS. 7 and 8, plural helical blades 33*ad* (rotation imparting part) are formed along the outer peripheral surface of the rotary member 33, and plural helical blades 33*ae* (rotation imparting part) are formed along the inner peripheral surface of the rotary member 33. According to such a configuration, since the cooling water presses the blades 33*ad*, 33*ae*, a force for rotating the rotary member 33 around the injection valve 10 acts, so that the rotary member 33 can be rotated. Therefore, it is possible to achieve the action and effect similar to the above embodiment. It is to be noted that only one of the blade 33*ad* and the blade 33*ae* may be formed on the rotary member 33.

Figure 9:
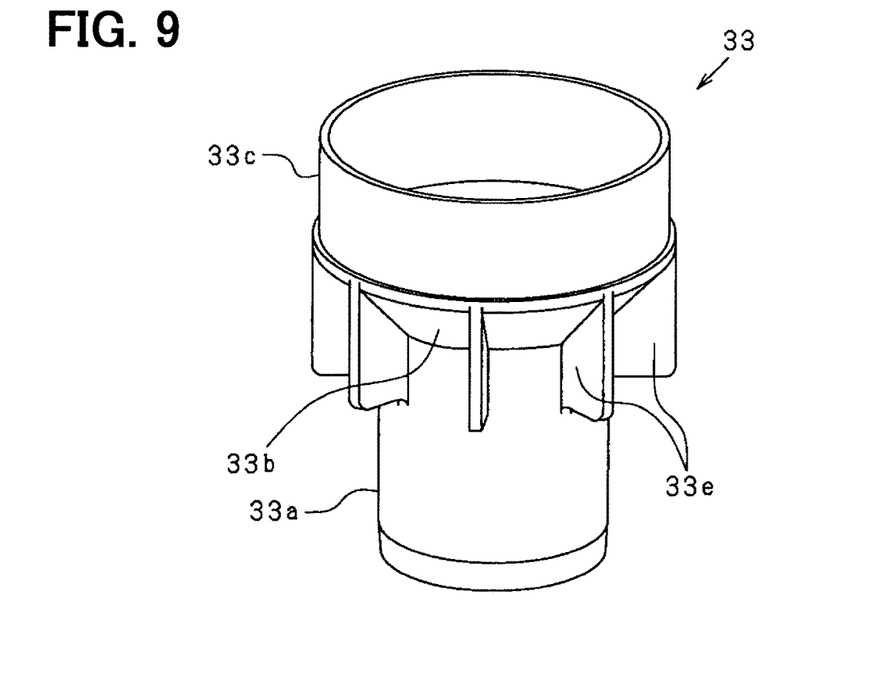
FIG. 9 is a perspective view illustrating another modification of the rotary member.

FIG. 9 is a perspective view illustrating another modification of the rotary member 33. As shown in FIG. 9, the rotary member 33 may include plural blades 33*e* (rotation imparting part) radially protruding from the outer peripheral surface in the radial direction of the rotary member 33 (the injection valve 10). Each of the blades 33*e* is formed in a flat plate. The blades 33*e* are arranged at a predetermined interval in the circumferential direction of the rotary member 33, and are projected from the outer peripheral surface of the end portion of the first cylindrical portion 33*a* adjacent to the conical portion 33*b* and the outer peripheral surface of the conical portion 33*b*.

Figure 10:
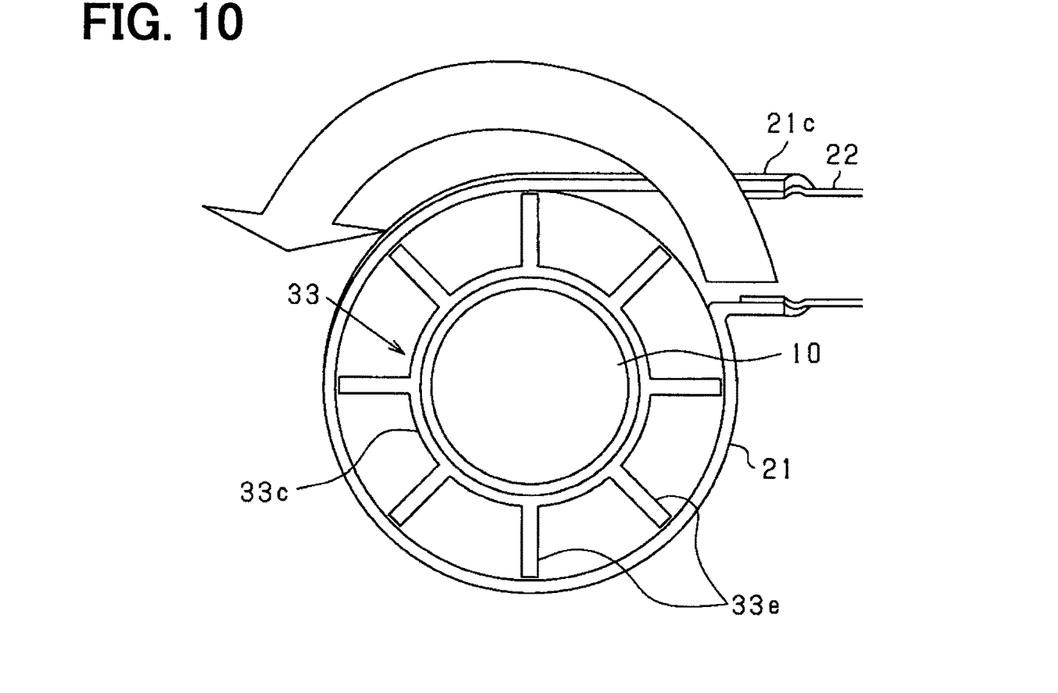
FIG. 10 is a plan view illustrating a positional relationship between the rotary member of FIG. 9 and an inflow port.

As shown in the plan view of FIG. 10, the first port 21*c* is arranged so that the cooling water flowing from the first port 21*c* (inflow port) hits the blades 33*e* in the circumferential direction of the injection valve 10. The extending direction (axis) of the first port 21*c* is deviated from the center axis of the injection valve 10. According to such a configuration, the cooling water presses the blade 33*e* that protrudes in the radial direction of the injection valve 10 from the outer peripheral surface of the rotary member 33 in the circumferential direction of the injection valve 10. As a result, a force for rotating the rotary member 33 about the injection valve 10 acts, so that the rotary member 33 can be rotated about the injection valve 10. Therefore, it is possible to achieve the action and effect similar to the above embodiment.

The cooling device 20 of the injection valve 10 may employ a cooling medium other than cooling water as the coolant.

The injection valve 10 may inject additive other than urea, for example, a reducing agent such as fuel.

According to an aspect of the present disclosure, a cooling device configured to cool, using a coolant, an injection valve that injects an additive includes a rotary member surrounding an outer periphery of the injection valve and extending along the injection valve. The rotary member is supported to be rotatable around the injection valve. A clearance between an outer peripheral surface of the injection valve and an inner peripheral surface of the rotary member defines a passage through which the coolant flows. The rotary member has a rotation imparting part that causes the rotary member to rotate about the injection valve in response to a flow of the coolant.

According to the above configuration, in the cooling device, the injection valve that injects the additive is cooled by the coolant. The rotary member surrounds the outer periphery of the injection valve and extends along the injection valve. The rotary member is supported to be rotatable around the injection valve. A passage through which the coolant flows is formed by a clearance between the outer peripheral surface of the injection valve and the inner peripheral surface of the rotary member. In some cases, bubbles may adhere to the injection valve in the passage for the coolant formed by the clearance between the outer peripheral surface of the injection valve and the inner peripheral surface of the rotary member.

In this regard, the rotary member has the rotation imparting part which rotates the rotary member about the injection valve by receiving the flow of the coolant. Therefore, when the rotation imparting part receives the flow of the coolant, the rotatably-supported rotary member rotates about the injection valve. Then, due to the viscosity of the coolant, the coolant is pulled by the rotary member, and a swirling flow around the injection valve occurs in the coolant flowing along the injection valve. Therefore, bubbles adhering to the injection valve can be easily removed by the swirling flow, and consequently it is possible to suppress a decrease in the efficiency of cooling the injection valve.

For example, the cooling device includes the fixed member 31 surrounding the outer periphery of the injection valve and extending along the injection valve, and the fixed member is fixed not to move. A clearance between the outer peripheral surface of the injection valve and an inner peripheral surface of the fixed member defines a passage through which the coolant flows. An end portion (the second cylindrical portion 33*c*) of the rotary member opposite from the tip portion 10*a* of the injection valve and an end portion (the first end portion 31*a*) of the fixed member adjacent to the tip portion of the injection valve are fitted to each other and slidable relative to each other in a circumferential direction of the injection valve.

According to the above configuration, the coolant flows in the passage formed between the outer peripheral surface of the injection valve and the inner peripheral surface of the fixed member. The end portion of the rotary member opposite to the tip portion of the injection valve and the end portion of the fixed member adjacent to the tip portion of the injection valve are fitted to each other, and are slidable relative to each other in the circumferential direction. Therefore, it is possible to rotatably support the rotary member about the injection valve by the fixed member, and to prevent leakage of the coolant from a gap between the fixed member and the rotary member.

For example, the rotation imparting part converts a part of kinetic energy of the coolant into a rotational energy of rotating the rotary member around the injection valve.

According to the above configuration, a part of the kinetic energy of the coolant is converted by the rotation imparting part into rotational energy to rotate the rotary member about the injection valve. Therefore, it is possible to rotate the rotary member about the injection valve.

Specifically, the rotation imparting part includes: the projection 33*d* projecting annularly on at least one of an inner peripheral side and an outer peripheral side of the rotary member; and the plural through holes 33*da* passing through the projection in an axial direction of the injection valve, and being inclined in the circumferential direction of the injection valve. According to such a configuration, since the through hole penetrates the projection in the axial direction of the injection valve and is inclined in the circumferential direction of the injection valve, when the coolant passes through the through hole, a force to rotate the rotary member acts around the injection valve. Therefore, it is possible to rotate the rotary member about the injection valve.

The projection may be in contact with a regulating portion (the first spring 35) that regulates the movement of the rotary member toward the tip portion of the injection valve in the axial direction. Therefore, while the above-described effect can be exerted, the projection can function as a portion to be brought into contact with the regulating portion.

More specifically, the rotation imparting part may include the plural grooves 33*ab*, 33*ac* formed in a spiral shape along at least one of an inner peripheral surface and an outer peripheral surface of the rotary member. According to such a configuration, since the coolant passes through the grooves, a force to rotate the rotary member about the injection valve acts, so that it is possible to rotate the rotary member about the injection valve.

More specifically, the rotation imparting part may include the plural blades 33*ad*, 33*ae* formed in a spiral shape along at least one of an inner peripheral surface and an outer peripheral surface of the rotary member. According to such a configuration, since the coolant presses the blades, a force for rotating the rotary member about the injection valve acts, so that the rotary member can be rotated about the injection valve.

Specifically, the rotation imparting part may include the plural blades 33*e* projecting radially from the outer peripheral surface of the rotary member in a radial direction of the injection valve. The inflow port 21c into which the coolant flows is provided at a position where the coolant flowing from the inflow port hits at least one of the blades in the circumferential direction of the injection valve. According to such a configuration, the coolant strikes the blade projecting in the radial direction of the injection valve from the outer peripheral surface of the rotary member in the circumferential direction of the injection valve. As a result, a force for rotating the rotary member about the injection valve acts, so that the rotary member can be rotated about the injection valve.

The rotary member may extend from an outer periphery of the tip portion of the injection valve along the injection valve.

According to the above configuration, since the rotary member extends along the injection valve from the outer periphery of the tip portion of the injection valve, it is possible to generate a swirling flow around the injection valve in the coolant near the tip portion of the injection valve. Therefore, bubbles adhering to the tip portion of the injection valve, where the temperature tends to rise easily, can be easily removed.

Such changes and modifications are to be understood as being within the scope of the present disclosure as defined by the appended claims.

What is claimed is:

1. A cooling device configured to cool, using a coolant, an injection valve that injects an additive, the cooling device comprising:
   a rotary member surrounding an outer periphery of the injection valve and extending along the injection valve, the rotary member being supported to be rotatable around the injection valve, wherein
   a clearance between an outer peripheral surface of the injection valve and an inner peripheral surface of the rotary member defines a passage through which the coolant flows, and
   the rotary member has a rotation imparting part that causes the rotary member to rotate about the injection valve in response to a flow of the coolant.

2. The cooling device according to claim 1, further comprising:
   a fixed member surrounding the outer periphery of the injection valve and extending along the injection valve, the fixed member being fixed not to move, wherein
   a clearance between the outer peripheral surface of the injection valve and an inner peripheral surface of the fixed member defines a passage through which the coolant flows, and
   an end portion of the rotary member opposite from a tip portion of the injection valve and an end portion of the fixed member adjacent to the tip portion of the injection valve are fitted to each other and slidable relative to each other in a circumferential direction of the injection valve.

3. The cooling device according to claim 1, wherein the rotation imparting part converts a part of kinetic energy of the coolant into a rotational energy for rotating the rotary member around the injection valve.

4. The cooling device according to claim 1, wherein
   the rotation imparting part includes
      a projection projecting annularly on at least one of an inner peripheral side and an outer peripheral side of the rotary member, and
      a plurality of through holes passing through the projection in an axial direction of the injection valve, and being inclined in a circumferential direction of the injection valve.

5. The cooling device according to claim 4, wherein
   the projection is in contact with a regulating portion that regulates the movement of the rotary member toward a tip portion of the injection valve in the axial direction.

6. The cooling device according to claim 1, wherein
   the rotation imparting part includes a plurality of grooves formed in a spiral shape along at least one of an inner peripheral surface and an outer peripheral surface of the rotary member.

7. The cooling device according to claim 1, wherein
   the rotation imparting part includes a plurality of blades formed in a spiral shape along at least one of an inner peripheral surface and an outer peripheral surface of the rotary member.

8. The cooling device according to claim 1, wherein
   the rotation imparting part includes a plurality of blades projecting radially from an outer peripheral surface of the rotary member in a radial direction of the injection valve, and
   an inflow port into which the coolant flows is provided at a position where the coolant flowing from the inflow port hits at least one of the blades in the circumferential direction of the injection valve.

9. The cooling device according to claim 1, wherein the rotary member extends from an outer periphery of a tip portion of the injection valve along the injection valve.

* * * * *